Figure 1:
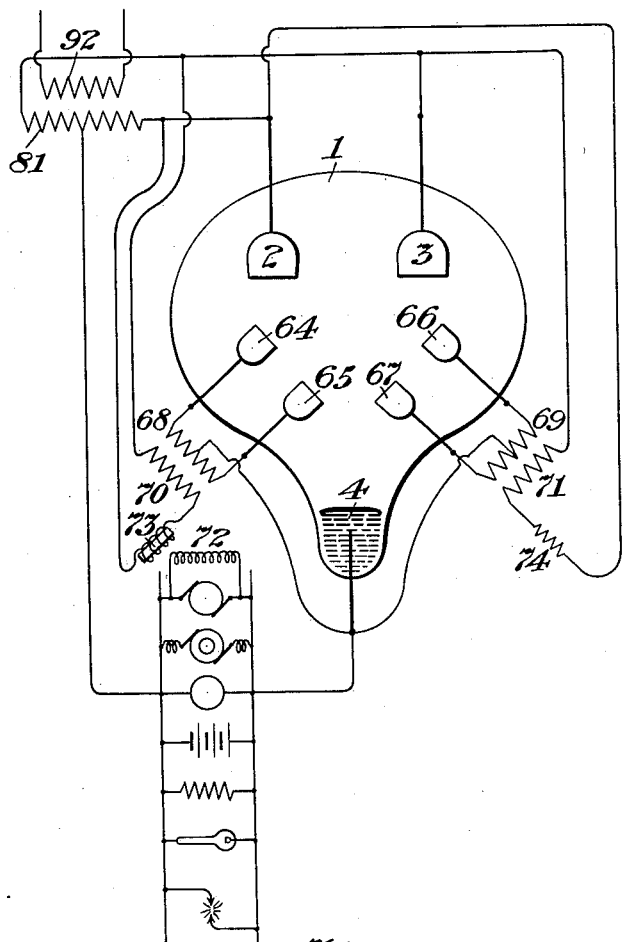

P. H. THOMAS.
VAPOR ELECTRIC APPARATUS.
APPLICATION FILED JAN. 21, 1913.

1,197,687.

Patented Sept. 12, 1916.
2 SHEETS—SHEET 1.

WITNESSES
Chas. F. Clagett
Tho. H. Brown

INVENTOR
Percy H. Thomas
BY
Charles A. Perry.
ATTORNEY

P. H. THOMAS.
VAPOR ELECTRIC APPARATUS.
APPLICATION FILED JAN. 21, 1913.

1,197,687.

Patented Sept. 12, 1916.
2 SHEETS—SHEET 2.

WITNESSES
Chas. J. Clagett
Thos. H. Brown

INVENTOR
Percy H. Thomas
BY
Charles A. Terry
ATTORNEY

UNITED STATES PATENT OFFICE.

PERCY H. THOMAS, OF UPPER MONTCLAIR, NEW JERSEY, ASSIGNOR TO COOPER HEWITT ELECTRIC CO., OF HOBOKEN, NEW JERSEY, A CORPORATION OF NEW JERSEY.

VAPOR ELECTRIC APPARATUS.

1,197,687. Specification of Letters Patent. Patented Sept. 12, 1916.

Original application filed October 19, 1911, Serial No. 655,606. Divided and this application filed January 21, 1913. Serial No. 743,250.

*To all whom it may concern:*

Be it known that I, PERCY H. THOMAS, a citizen of the United States, and resident of Upper Montclair, county of Essex, State of New Jersey, have invented certain new and useful Improvements in Vapor Electric Apparatus, of which the following is a specification.

My invention relates to a vapor apparatus or mercury vapor apparatus, such as is frequently used for the rectification of alternating currents, more particularly to means for exciting rectifiers having natural points of deficiency in the supply electromotive-force.

Such rectifiers as I have just referred to have been long used for many purposes and many such rectifiers require exciting means serving to maintain continuity of operation. Sometimes a multiphase source of current has been used and one or more phases thereof utilized to maintain operation at periods when another phase or other phases are unable to supply current to the rectifier. In other cases reactances have been used to momentarily provide an electro-motive force operating on the cathode of the rectifier bulb to maintain the excitation thereof during the critical supply periods. Again, when desired, a storage battery or a separate direct current generator may be used to excite the cathode by the maintenance thereat of a continuous flow of current. My present invention seeks, however, to excite and maintain a vapor rectifier by different means operating through different circuits, but still well adapted to many practical systems. In this invention I make use of energy obtained from the supply and stored in some form as in an electric static condenser or storage battery, as distinguished from an inductance, which energy is discharged to maintain the excitation of the cathode. I thus do not rely upon any of the old systems of excitation at present known to me.

As the type of rectifier here under consideration is well known, it is not necessary to enter into details as to its construction or manufacture. Such rectifiers are described, for example, in Patents Nos. 955,459, 955,460, issued April 19, 1910, to Peter Cooper Hewitt. My invention provides suitable circuits and apparatus for maintaining continuity of current flow in the cathode of such a rectifier. For further details as to the operation of these rectifiers and further description of the exciting circuits, reference is requested to the description of the several figures of the drawings and the present specification.

Figure 2:
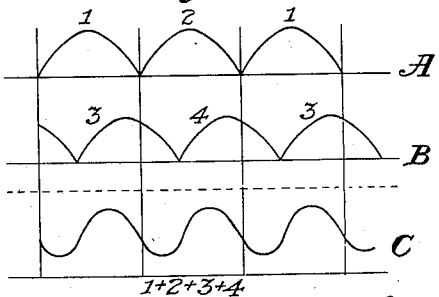
Figure 3:
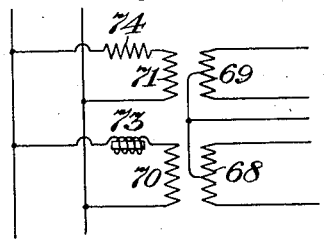
Figure 4:
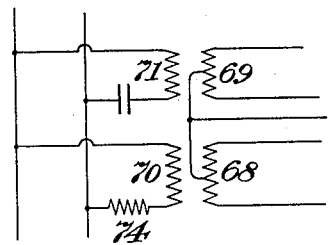
Figure 5:
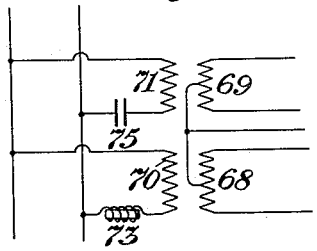
Figure 6:
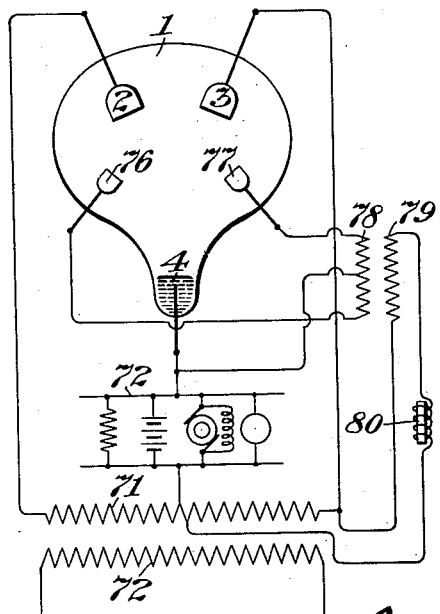

In the following drawings, Figure 1 shows a method of excitation using energy storing means in the circuit of the rectified current. Fig. 2 shows in a diagram the combination of exciting currents in the cathode of Fig. 1. Figs. 3, 4 and 5 are variations of Fig. 1 and show different ways of getting four-phase currents, or a number of currents out of phase from a single phase supply. Fig. 6 is a simple form of Fig. 1.

In Fig. 1, 1 is the exhausted container, which may be of glass, porcelain, metal, iron, or other suitable material, or combination of materials; 2 and 3 are the main anodes, and 4, the cathode, the latter frequently being of mercury. The supply, which may be a transformer secondary, is shown at 81 and the load circuit at 72. The rectifier 1 is supplied with four auxiliary anodes, 64, 65, 66 and 67. These are supplied in pairs from the transformer secondaries 68, 69, fed respectively by the primaries 70 and 71, which may be energized from the main supply 81 or from some other supply. The work circuit 72 is connected between the lead of the cathode 4 and an intermediate point of the supply 81 which may be a transformer secondary, the primary being shown at 92 or may be a generator winding. In this work circuit I may use a series of shunt motors, incandescent lamps, storage batteries, resistances, mercury vapor lamps, arc lamps, etc.

The operation of this system may be briefly described as follows: In Fig. 1 during one alteration of the supply, current will flow from the one half of the transformer winding 81 through anode 3, cathode 4, the work circuit 72 back to the starting point. Current will also flow at the right time from the other half of the transformer winding 81, anode 2, cathode 4, the work circuit 72 to the starting point. Current cannot flow from the anode 3 to the anode 2 on account of the starting reluctance of the anode 2.

It is clear that when a rectifier is started into operation, which may be accomplished in any of the well known ways, that the transformer secondary 69 will send alternate pulsations of current from the anodes 66 and 67 to the cathode 4, back to the intermediate point of this winding, and that similarly the secondary 68 will send alternate pulsations from the anodes 64 and 65, to the cathode 4, back to the intermediate point of the winding; but the pulsations from the secondary 68 will be delayed in time by the impedance 73 in series with the primary 70 so that the four sets of impulses will overlap and maintain a continuous flow of current in the cathode. This arrangement may be said to utilize the principle of the Tesla split phase method of obtaining polyphase currents, it being thus customary to delay current in one circuit over that in another by the use of inductance in one of the circuits. I may use, if desired, a resistance 74 in series with the primary 71. With this arrangement the main load current can be entirely discontinued and the other currents will maintain it in operation.

As a matter of illustration, I have shown in Fig. 2 at A, the current flowing from the secondary 69 and at B, the current flowing from the secondary 68, and at C, the combination current passing in the cathode, which latter current is obviously continuous and will serve to excite the rectifier.

In Fig. 3 I have shown the arrangement of Fig. 1 for obtaining what might be called the polyphase exciting current for supplying the four auxiliary anodes. The parts in Figs. 1 and 3 are similarly numbered and need no special explanation.

In Fig. 4 I have shown another method of obtaining the effect of polyphase current, the condenser 75 being inserted in one of the primary leads while the resistance 74 may or may not be inserted in the other. The action of the condenser will be to advance the time of the impulses fed from the secondary 69 before the time of the impulses fed from the secondary 68, thus causing an overlap.

In Fig. 5 I have shown another system combining the effects of the systems of Figs. 3 and 4. Here the action of the condenser 75 and the coil 73 are cumulative, increasing the effectiveness of the arrangement.

In Fig. 6 I have shown a system somewhat similar to Fig. 1 but utilizing only one set of auxiliary anodes, namely: 76 and 77 fed from the transformer secondary 78 which is fed by the primary 79 through the inductance 80, from the main supply or otherwise. The work circuit 72 is similarly numbered to Fig. 1. In this case the overlap in impulses is obtained between the main anodes 2 and 3 and supplementary anodes 76 and 77, thus securing continuity with but two auxiliary anodes.

In describing the above circuits, I wish it understood that I claim broadly the principles and novel apparatus set forth therein and do not wish to be specifically limited to the particular circuits shown, for there are many obvious variations thereof which serve to accomplish the same purpose in substantially the same way, which fall within my invention. Various modifications of the circuits which I usually show in connection with but one main figure can obviously be applied to the structures of other figures, and it is my intention that where practicable they shall be so applied.

This case is a division of my application Serial Number 655,606, filed October 19th, 1911.

I claim as my invention:

1. The combination with a main source of single-phase alternating current, a mercury vapor rectifier comprising an exhausted container, main anodes and a cooperating cathode therein, and connections from the main source to the main electrodes, of means for maintaining the rectifier excited consisting of a plurality of sources of alternating electromotive-forces derived from said main source of current, and a plurality of sets of supplemental anodes in said rectifier, each set being connected to one of said sources of derived electromotive-forces, and means for altering the phase of the zero points of one of said derived alternating electromotive-forces.

2. In a system of electrical distribution, the combination with a main source of alternating current, a rectifier comprising an exhausted container and main electrodes therein, and connections from the main source to said electrodes, of two circuits extending from said main source traversing said rectifier, each circuit supplying a plurality of sets of current impulses and means for altering the phase of the current in one of said two circuits.

3. In a system of electrical distribution, the combination with a main source of alternating current, a rectifier comprising an exhausted container and main electrodes therein, and connections from the main source to said electrodes, of two circuits extending from said main source traversing said rectifier, each circuit supplying a plurality of sets of current impulses and means for altering the phase of the current in one of said two circuits, said means being located in that portion of the circuit traversed by alternating current.

4. The combination with a single phase alternating supply and a rectifier comprising an exhausted container and main anodes and a common cathode therein, and a plurality of cooperating sets of keep-alive circuits, of means for exciting said circuits including means for deriving split-phase electromotive-forces from said single-phase source, and means for passing the currents derived therefrom through said cathode.

5. In a system of electrical distribution, the combination with a main source of alternating current, a rectifier comprising an exhausted container, main anodes and a coöperating cathode therein, and connections for supplying currents from said source to said rectifier, of means for exciting said rectifier consisting of a plurality of sources of alternating electromotive-forces derived from said main source of current, and a plurality of sets of supplemental anodes in said rectifier, each set being connected to one of said sources of derived electromotive-forces, and means for delaying the current impulses of said derived electromotive forces flowing in one set of said anodes, said means consisting of an inductance traversed by alternating current.

Signed at New York, in the county of New York and State of New York this 20th day of January, A. D. 1913.

PERCY H. THOMAS.

Witnesses:
 WM. H. CAPEL,
 THOS. H. BROWN.